US009148842B2

(12) United States Patent
Qi et al.

(10) Patent No.: US 9,148,842 B2
(45) Date of Patent: Sep. 29, 2015

(54) METHODS, WIRELESS COMMUNICATION STATIONS, AND SYSTEM FOR DEVICE-TO-DEVICE DISCOVERY AND ADVERTISEMENT

(71) Applicant: Intel Corporation, Santa Clara, CA (US)

(72) Inventors: Emily H. Qi, Portland, OR (US); Minyoung Park, Portland, OR (US); Po-Kai Huang, West Lafayette, IN (US)

(73) Assignee: Intel Corporation, Santa Clara, CA (US)

( * ) Notice: Subject to any disclaimer, the term of this patent is extended or adjusted under 35 U.S.C. 154(b) by 52 days.

(21) Appl. No.: 13/793,337

(22) Filed: Mar. 11, 2013

(65) Prior Publication Data

US 2014/0112323 A1    Apr. 24, 2014

Related U.S. Application Data

(60) Provisional application No. 61/717,819, filed on Oct. 24, 2012.

(51) Int. Cl.
| | | |
|---|---|---|
| *H04W 48/10* | (2009.01) | |
| *H04W 48/12* | (2009.01) | |
| *H04L 5/00* | (2006.01) | |
| *H04W 48/14* | (2009.01) | |

(52) U.S. Cl.
CPC ............ *H04W 48/10* (2013.01); *H04W 48/12* (2013.01); *H04L 5/0048* (2013.01); *H04W 48/14* (2013.01)

(58) Field of Classification Search
USPC .......................... 370/310–350, 908–911, 477
See application file for complete search history.

(56) References Cited

U.S. PATENT DOCUMENTS

| | | | | |
|---|---|---|---|---|
| 6,314,091 | B1 * | 11/2001 | LaRowe et al. | 370/338 |
| 7,106,695 | B2 * | 9/2006 | Denecheau et al. | 370/230 |
| 7,130,927 | B2 * | 10/2006 | Denecheau et al. | 709/251 |
| 7,428,229 | B2 * | 9/2008 | Bonta et al. | 370/338 |
| 7,474,874 | B2 * | 1/2009 | Lahetkangas et al. | 455/41.2 |
| 7,653,394 | B2 * | 1/2010 | McMillin | 455/444 |

(Continued)

FOREIGN PATENT DOCUMENTS

| | | |
|---|---|---|
| WO | WO-2012091418 A2 | 7/2012 |
| WO | WO-2014065979 A1 | 5/2014 |

OTHER PUBLICATIONS

"International Application Serial No. PCT/US2013/061449, International Search Report mailed Dec. 16, 2013", 3 pgs.

(Continued)

*Primary Examiner* — Jeffrey M Rutkowski
*Assistant Examiner* — Jonathan B Wood
(74) *Attorney, Agent, or Firm* — Schwegman Lundberg & Woessner, P.A.

(57) ABSTRACT

Embodiments of a user station (STA) and methods for device-to-device discovery and advertisement through broadcast beacon signals are generally described herein. In some embodiments, group information, including a list of STAs in an advertising group, is transmitted in a beacon. A STA may transmit a request to join the advertising group. The request may be transmitted to an upchain STA, the upchain STA being determined based on inspection of the list of STAs of the advertising group. After receiving a response to the request, the STA may periodically broadcast the beacon and the STA may transmit acknowledgements to the upchain STA upon receiving beacons from the upchain STA.

21 Claims, 5 Drawing Sheets

(56) References Cited

U.S. PATENT DOCUMENTS

| | | | |
|---|---|---|---|
| 7,660,287 B2 * | 2/2010 | Axelsson et al. | 370/338 |
| 7,768,992 B2 * | 8/2010 | Pun | 370/347 |
| 7,814,322 B2 * | 10/2010 | Gurevich et al. | 713/171 |
| 7,827,243 B2 * | 11/2010 | Lee et al. | 709/205 |
| 8,060,129 B2 * | 11/2011 | Grob et al. | 455/522 |
| 8,068,454 B2 * | 11/2011 | Bonta et al. | 370/329 |
| 2006/0221891 A1 * | 10/2006 | Schmitz et al. | 370/328 |
| 2006/0227801 A1 * | 10/2006 | Nanda et al. | 370/447 |
| 2007/0115897 A1 * | 5/2007 | Chen et al. | 370/338 |
| 2009/0323655 A1 * | 12/2009 | Cardona et al. | 370/338 |
| 2010/0097969 A1 * | 4/2010 | De Kimpe et al. | 370/311 |
| 2010/0208662 A1 * | 8/2010 | Fuste Vilella et al. | 370/328 |
| 2010/0271945 A1 * | 10/2010 | Clave et al. | 370/230.1 |
| 2010/0302947 A1 * | 12/2010 | Leppanen et al. | 370/241 |
| 2011/0019652 A1 * | 1/2011 | Atwal | 370/338 |
| 2011/0055326 A1 | 3/2011 | Michaelis et al. | |
| 2011/0069652 A1 * | 3/2011 | Kakani et al. | 370/312 |
| 2011/0090880 A1 * | 4/2011 | Abraham et al. | 370/338 |
| 2011/0182280 A1 * | 7/2011 | Charbit et al. | 370/350 |
| 2011/0256896 A1 | 10/2011 | Giaretta et al. | |
| 2011/0316716 A1 * | 12/2011 | MacKay et al. | 340/870.02 |
| 2012/0057577 A1 * | 3/2012 | Dwivedi et al. | 370/338 |
| 2012/0093098 A1 | 4/2012 | Charbit et al. | |

OTHER PUBLICATIONS

"International Application Serial No. PCT/US2013/061449, Written Opinion mailed Dec. 16, 2013", 5 pgs.

* cited by examiner

|        | T1      | T2      | T3      | T4      |
|--------|---------|---------|---------|---------|
| Device A | A,B,C,D |         |         |         |
| Device B |         | A,B,C,D |         |         |
| Device C |         |         | A,B,C,D |         |
| Device D |         |         |         | A,B,C,D |

FIG. 2

METHODS, WIRELESS COMMUNICATION STATIONS, AND SYSTEM FOR DEVICE-TO-DEVICE DISCOVERY AND ADVERTISEMENT

CROSS-REFERENCE TO RELATED APPLICATIONS

This application claims priority to U.S. Provisional Patent Application No. 61/717,819 entitled "A Reliable Synched Distributed Advertisement Mechanism for D2D Discovery" filed on Oct. 24, 2012, the content of which is incorporated herein by reference in its entirety.

TECHNICAL FIELD

Embodiments pertain to communication networks. Some embodiments pertain to wireless devices operating in wireless local area networks (WLANs) in accordance with Institute of Electrical and Electronics Engineers (IEEE) 802.11 family of standards.

BACKGROUND

Recently, there has arisen a demand for systems that perform device-to-device (D2D) discovery among devices within a Wi-Fi service area, and D2D advertisement of commercial or social information among these devices. In order to support discovery and advertisement, devices in some systems broadcast their own information periodically, which may require large amounts of device power and consume substantial bandwidth in the Wi-Fi service area.

Some other systems provide D2D advertisement with reduced power and bandwidth consumption by allowing one device at a time, sequentially and periodically, to broadcast the information for devices in a Wi-Fi service area. Nevertheless, the devices in the group may not be aware if a device leaves the Wi-Fi service area or otherwise is unable to receive or broadcast the group information. This may lead to a breakdown of the group.

Accordingly, there is a general need for improved reliability in D2D group discovery and advertisement.

BRIEF DESCRIPTION OF THE DRAWINGS

FIG. 2 illustrates transmissions of an ordered list of user stations (STAs) in an advertising group in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
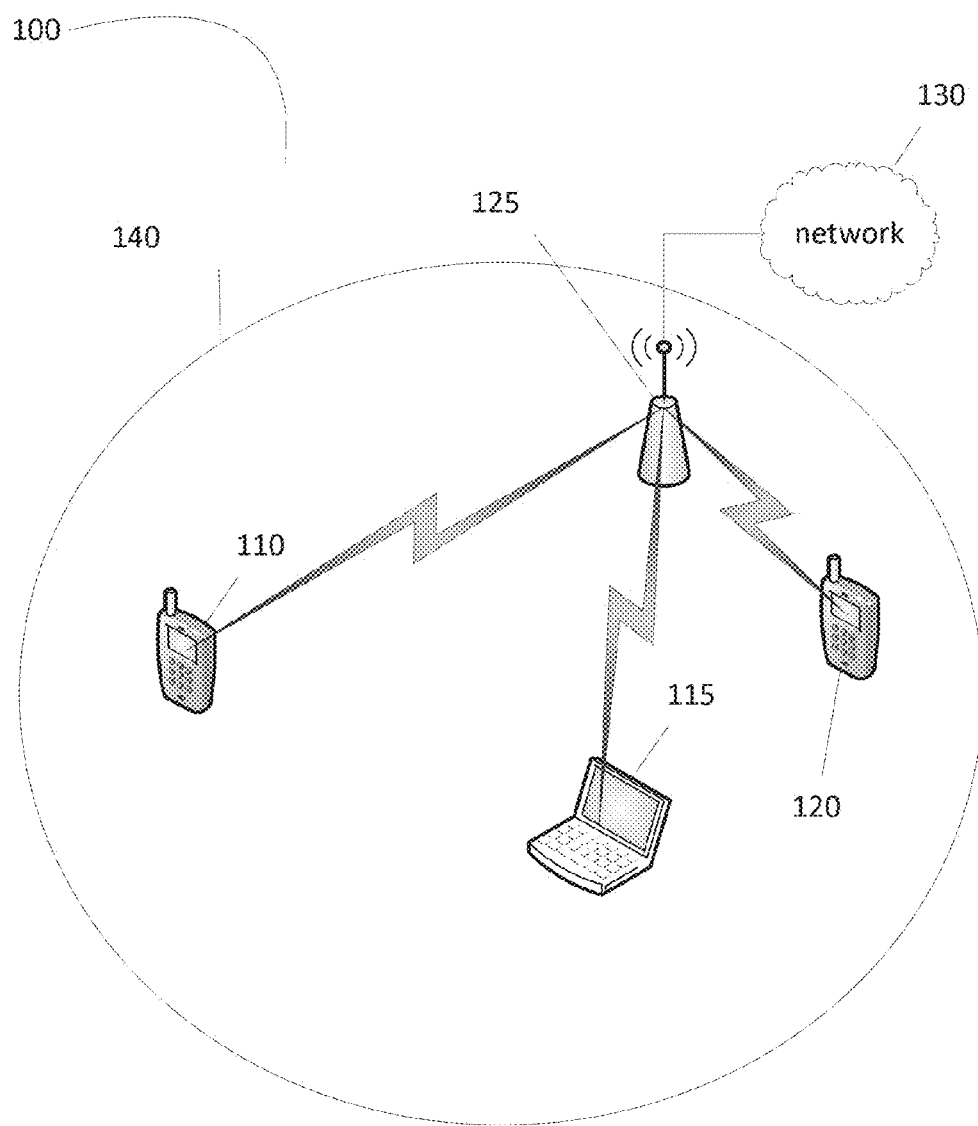
FIG. 1 illustrates a wireless local area network (WLAN) in which example embodiments are implemented.

FIG. 1 illustrates a system 100 in which example embodiments may be implemented. The system 100 includes user wireless communication stations (STAs) 110, 115 and 120. The user STAs 110, 115 and 120 may be, for example, laptop computers, smart phones, tablet computers, or any other wireless device. In an example, the user STAs 110, 115 and 120 have a wireless connection through a STA 125 to the network 130. The STA 125 may be a more stationary communication unit such as a wireless access point (AP) and will hereinafter be referred to as the AP 125. In some embodiments, the user STAs 110, 115 and 120 and the AP 125 may transmit and/or receive communications in accordance with specific communication standards, such as the IEEE 802.11 standards although user STAs 110, 115 and 120 and the AP 125 may also be suitable to transmit and/or receive communications in accordance with other techniques.

One or more of the user STAs 110, 115 or 120 may advertise social, commercial, or other information to other user STAs 110, 115, or 120 by broadcasting signals including this information. In order to advertise information, a user STA 110, 115, or 120 may wake up to transmit the information, and the waking up process may consume large amounts of power. Further, if several user STAs in the group wish to transmit, channel congestion may occur.

To reduce the number of overall broadcast transmissions, and the number of transmissions by any given user STA 110, 115, or 120, some systems may provide a synchronized advertisement mechanism. In these systems, the user STAs 110, 115, or 120 may take turns advertising all of the information for each user STA 110, 115, and 120 in a group 140. In this way, the user STAs 110, 115 or 120 may conserve power and channel congestion may be reduced at least because there may be fewer overall advertisement broadcasts. However, if one user STA 110, 115 or 120 leaves the range of the AP 125, or is unable to broadcast or receive transmissions for any reason, the synchronized advertising mechanism may fail.

Example embodiments may provide more reliable maintenance for the group of STAs 110, 115 or 120, referred to hereinafter as an "advertising group." In example embodiments, the advertising group may maintain an ordered group list of user STAs in the advertising group. The ordered list may be transmitted within a beacon of each broadcast transmission to provide updated membership information for the user STAs 110, 115 and 120.

In an embodiment, the ordered list may specify the order in which user STAs of the group are to take turns transmitting a beacon with group information. Hereinafter, a first user STA 110, 115 or 120 previous to a second user STA 110, 115 or 120 in the ordered list is referred to as an "upchain" STA of the second user STA. The second user STA is referred to as a "downchain" STA of the first user STA.

FIG. 2 illustrates transmissions of an ordered list of user STAs in an advertising group in accordance with some embodiments. In the illustrative example, Device A is an upchain device to Device B. Device B therefore is a downchain device to Device A. Device B is an upchain device to Device C. Device C is a downchain device to Device B and Device C is an upchain device to Device D. Device D is a downchain device to Device C. Devices A, B, C, and D may be user STAs similar to STAs 110, 115 or 120 (FIG. 1).

In time interval T1, Device A may advertise all of the information for the advertising group comprising Devices A, B, C, and D by transmitting a beacon with this information. The beacon further includes the group list. The beacon may specify a broadcast address as the destination for the beacon. The beacon may only be transmitted to downchain Device B. Device B may wake at such a time as its upchain Device A is transmitting the beacon, so that Device C and Device D may remain in a sleep mode to conserve power.

In time interval T2, Device B may advertise all of the information for Devices A, B, C and D by transmitting a beacon with this information. The beacon may further include the group list. The beacon may specify a broadcast address as the destination address for the beacon. The beacon may only be transmitted to downchain Device C. Device C may wake at such a time as its upchain Device B is transmitting the beacon, so that Device A and Device D may remain in a sleep mode to conserve power.

Similarly, in time intervals T3 and T4, Device C and Device D, respectively, transmit the beacon. Device D may transmit the beacon to Device A. If a device leaves the group for some reason, or is unable to transmit, the group list may be updated to remove the non-communicative device and transmitted in a next time interval so that a next downchain device can receive the updated group list.

Figure 3:
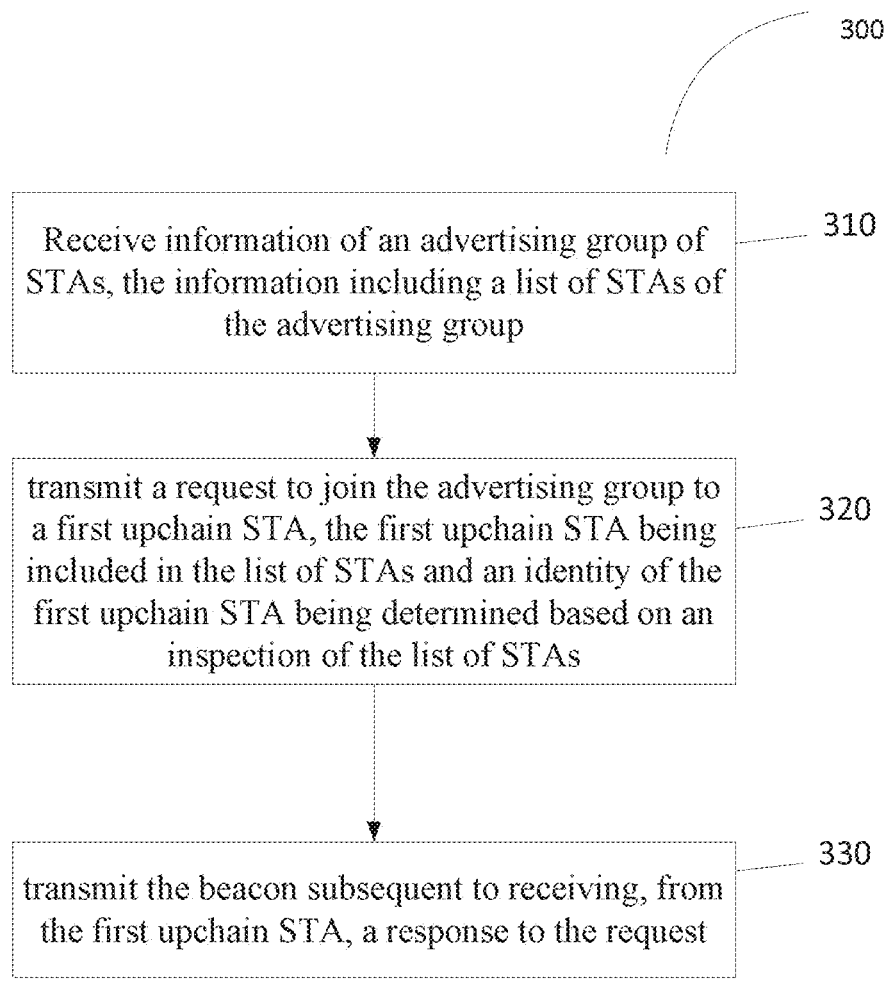
FIG. 3 is a flow diagram of a procedure performed by a user STA for broadcasting in a wireless communication network, in accordance with some embodiments.

FIG. 3 illustrates a method 300, performed by the user STA 110, for operating in a wireless network.

Referring to FIG. 3, in operation 310, the user STA 110 may receive information of an advertising group of STAs. The information may include a list of STAs in the advertising group. The information may be received in a beacon transmitted by the STA 115, by the STA 120, or by another STA in the group 140 (FIG. 1). The STAs in the advertising group may be within a broadcast range of the user STA 110. For example, the STAs in the advertising group may be the user STAs 115 and 120, or other STAs in the group 140 (FIG. 1). The beacon may be configured in accordance with a standard of the Institute of Electrical and Electronics Engineers (IEEE) 802.11 family of standards.

In operation 320, the user STA 110 may transmit a request to join the advertising group 140. The user STA 110 may transmit the request to an upchain STA. The upchain STA may be the user STA 115 or 120 or another STA in the group 140. The user STA 110 may determine the identity of the upchain STA based on an inspection of the ordered list of STAs that was received in the beacon in operation 310. The user STA 110 may transmit the request to join during a join window associated with the upchain STA.

In operation 330, the upchain STA may respond with a join response, and the user STA 110 may respond to the join response with an ACK. In this manner, it may be established that the user STA 110 and the upchain STA are capable of communicating with each other. Subsequently, the user STA 110 may transmit the beacon to another device, for example a downchain device. The beacon may include group information. The group information may include the group list, including at least the user STA 110 and the upchain STA. The information may include social information or commercial information of one or more of the STAs 110, 115, or 120 of the group 140. Social information may be, for example, information that might be pertinent to a user STA's social network, such as notifications that a user is present in a location, information about a user's friends or contact list, user reviews or comments on a location or merchant, etc. Commercial information may be, for example, advertisements or special offers pertinent to the location of the user STA. The user STA 110 may continue to receive beacons from the upchain STA. The user STA 110 may transmit ACK messages to the upchain STA in response to receiving beacons transmitted by the upchain STA.

The user STA 110 may receive a request to join the advertising group from a downchain STA. The downchain STA may be the user STA 115, or 120, or another user STA in the group 140. Upon receiving the request, the user STA 110 may wake from a sleep mode. The user STA 110 may acknowledge the request, and subsequently the user STA 110 may transmit a beacon to the downchain STA. The beacon may include the list of STAs of the advertising group. The list may include the downchain STA. The user STA 110 may re-enter the sleep mode after transmitting the beacon.

The user STA 110 may take turns with the other STAs of the group 140 to transmit the beacon periodically. A time interval between transmissions by the user STA 110 may be determined based on the number of STAs in the group 140. A time interval between transmissions by the user STA 110 may be relatively large, i.e., the STA 110 may be responsible for transmitting the beacon less frequently, in a group 140 with relatively many members. Conversely, for a group 140 with relatively few members, the user STA 110 may be responsible for transmitting the beacon more often.

The user STA 110 may determine that the upchain STA has terminated transmissions of the beacon. The user STA 110 may determine this based on an examination of the list of STAs of the group 140 and based on a comparison of the sending address of the beacon with the list information. The user STA 110 may subsequently receive the beacon from a second upchain STA, and the user STA 110 may transmit an ACK in response to the beacon transmitted by the second upchain STA.

Figure 4:
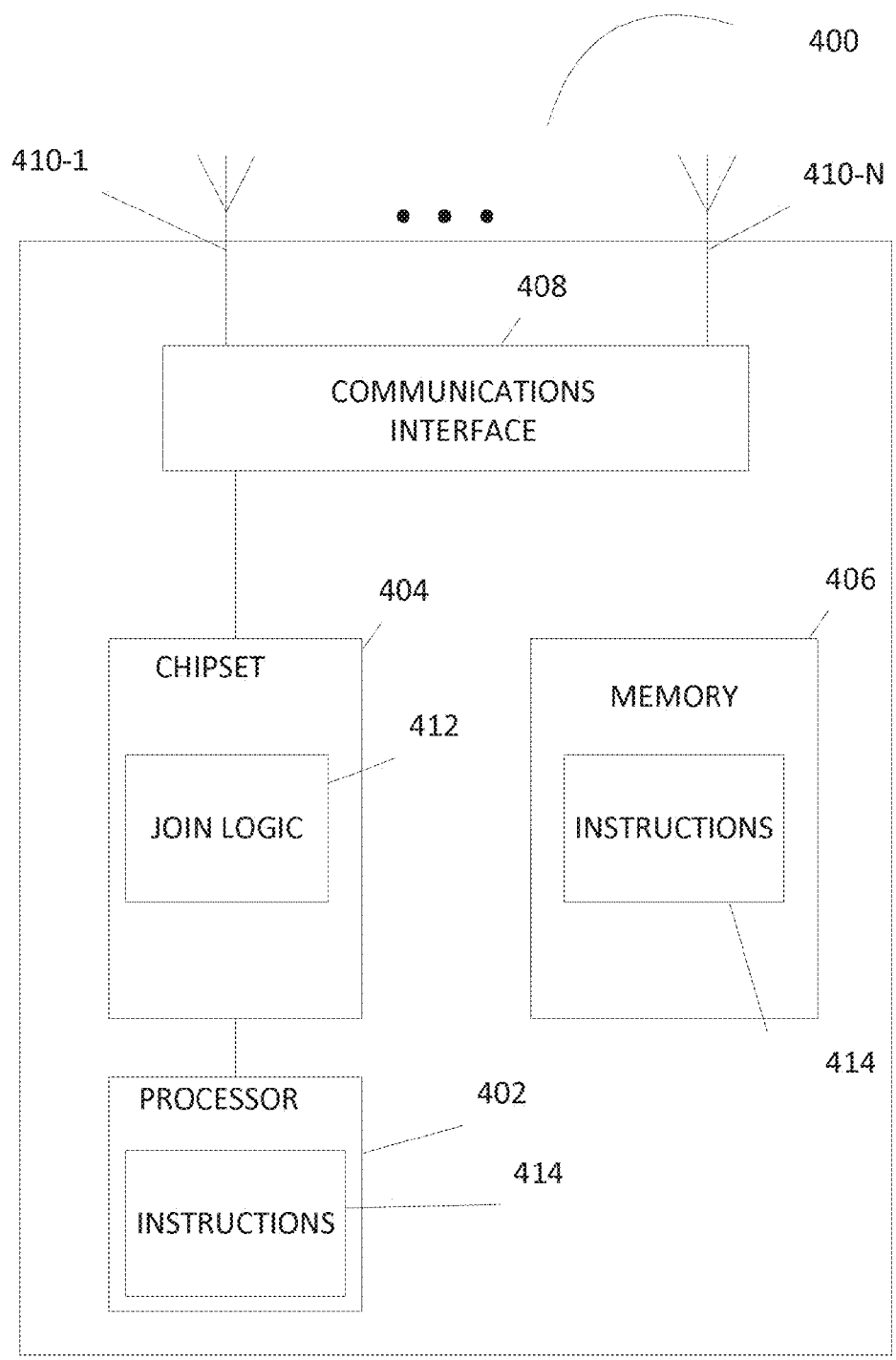
FIG. 4 illustrates a functional block diagram of a communication station (STA), in accordance with some embodiments.

FIG. 4 illustrates a functional block diagram of a STA 400, in accordance with some embodiments. The STA 400 may be suitable as a user STA 110, 115, or 120 (FIG. 1) or as Device A, B, C, or D (FIG. 2). The STA 400 may support methods for operating in a wireless communication network, in accordance with embodiments. The STA 400 may include a processor 402, which uses a chipset 404 to access on-chip state memory 406, as well as a communications interface 408. In one embodiment the memory 406 includes, but is not limited to, random access memory (RAM), dynamic RAM (DRAM), static RAM (SRAM), synchronous DRAM (SDRAM), double data rate (DDR) SDRAM (DDR-SDRAM), or any device capable of supporting high-speed buffering of data.

In at least one embodiment, the communications interface 408 is, for example, a wireless Physical Layer (PHY), which operates according to a multiple input/multiple output (MIMO) operation. The communications interface 408 may receive a list of STAs of an advertising group 140 (FIG. 1). The STAs of the advertising group 140 may be within a broadcast range of the STA 400. The communications interface 408 may transmit a join request to a first upchain STA, in a join window of a broadcast time interval associated with the upchain STA. The first upchain STA may be a member of the list of STAs of the advertising group 140. The communications interface 408 may receive a response to the request from the first upchain STA. The communications interface 408 may transmit ACKs to subsequent beacons transmitted by the first upchain STA.

The communications interface 408 may periodically broadcast social information or advertising information of the advertising group 140 subsequent to receiving the response to the join request from the first upchain STA. As described above with respect to FIG. 3, a time interval between the broadcasts may be based on the number of STAs in the advertising group 140.

The communications interface 408 may receive a request to join the advertising group 140 from a downchain STA. The communications interface 408 may transmit a beacon to the downchain STA upon accepting this request.

The chipset 404 may incorporate therein Join Logic 412 to, for example, configure a join request message for joining an advertising group 140 of user STAs. In an embodiment, the chipset 404 provides MAC layer functionality.

Embodiments may be implemented in one or a combination of hardware, firmware and software. Embodiments may also be implemented as instructions 414 stored on a computer-readable storage device, which may be read and executed by at least one processor 402 to perform the operations described herein.

The processor 402 may be arranged to determine an identity of the upchain STA based on an inspection of the list of STAs of the advertising group 140. The processor 402 may be arranged to add downchain STAs to the list of STAs of the advertising group 140. The processor 402 may be arranged to determine that a beacon transmission was received from a second upchain STA different from the first upchain STA. The processor 402 may be arranged to remove the first upchain STA from the list based on the determining. The communications interface 408 may subsequently transmit ACKs to the second upchain STA in response to receiving beacon transmissions from the second upchain STA.

The processor 402 may be arranged to enter a sleep mode after transmitting each periodic broadcast of the group information.

The processor 402 may be arranged to determine whether an ACK of a broadcast has been received from a downchain STA within a time interval. The processor 402 may be arranged to remove the downchain STA from the list or retransmit the beacon to the downchain STA if an ACK has not been received from the downchain STA within the time interval. If the processor 402 removes the downchain STA from the list, the processor 402 may retransmit the beacon to a second downchain STA.

In some embodiments, the instructions 414 are stored on the processor 402 or the memory 406 such that the processor 402 and the memory 406 act as computer-readable media. A computer-readable storage device may include any non-transitory mechanism for storing information in a form readable by a machine (e.g., a computer). For example, a computer-readable storage device may include ROM, RAM, magnetic disk storage media, optical storage media, flash-memory devices, and other storage devices and media.

The instructions 414, when executed on the STA 400, may cause the STA 400 to extract a list of user stations (STAs) of an advertising group from a beacon and store the list in the memory 406. The advertising group may be within a broadcast range of the STA 400. The instructions 414, when executed on the STA 400, may cause the STA 400 to transmit a join request to a first upchain STA. The identity of the first upchain STA may be determined based on an inspection of the list of STAs. The instructions 414, when executed on the STA 400, may cause the STA 400 to periodically transmit advertising information or social information of the advertising group subsequent to receiving a response to the join request. The time interval between transmissions may be based on the number of STAs in the advertising group. The instructions 414, when executed on the STA 400, may cause the STA 400 to transmit an ACK to the first upchain STA in response to receiving a beacon transmitted by the first upchain STA.

Although the STA 400 is illustrated as having several separate functional elements, one or more of the functional elements may be combined and may be implemented by combinations of software-configured elements, such as processing elements including digital signal processors (DSPs) and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements of the STA 400 may refer to one or more processes operating on one or more processing elements.

The STA 400 may include multiple transmit and receive antennas 410-1 through 410-N, where N is a natural number. Antennas 410-1 through 410-N may comprise one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some MIMO embodiments, antennas 410-1 through 410-N may be effectively separated to take advantage of spatial diversity and the different channel characteristics that may result between each of antennas 410-1 through 410-N. In some MIMO embodiments, antennas 410-1 through 410-N may be separated by up to $\frac{1}{10}$ of a wavelength or more.

Figure 5:
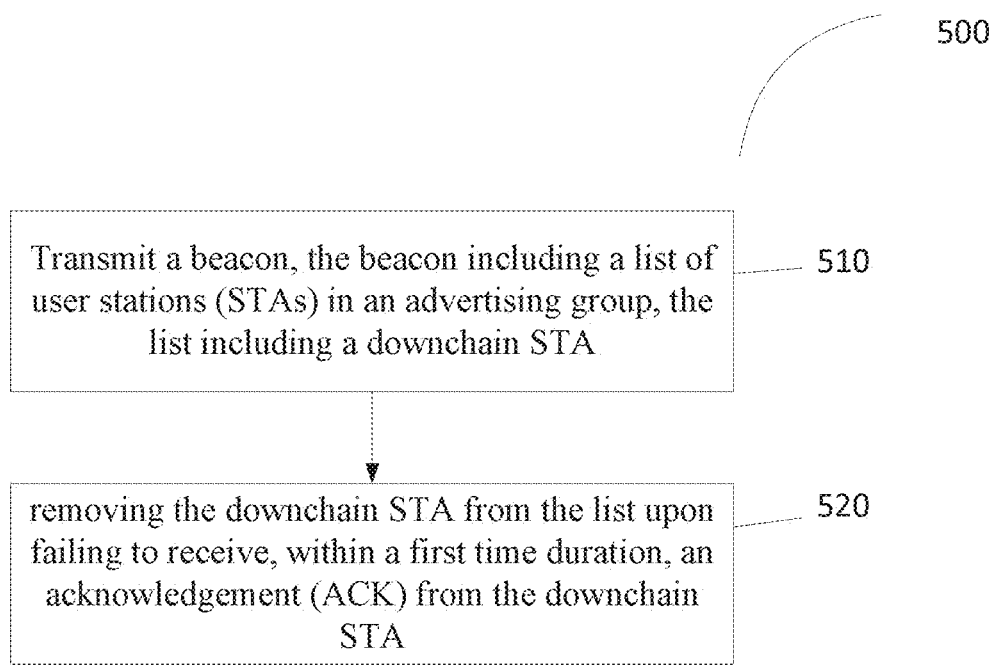
FIG. 5 is a flow diagram of a procedure for reducing device-to-device broadcast failures in a wireless communication network in accordance with some embodiments.

FIG. 5 illustrates a method 500, performed by the user STA 110, for reducing device-to-device broadcast failures in a wireless communication network. In operation 510, the user STA 110 may transmit a beacon. The beacon may include a list of user STAs in an advertising group 140. The list may include a downchain STA as described above with respect to FIG. 2.

The user STA 110 may transmit the beacon to the downchain STA. The downchain STA may compare the sending address of the beacon with group information to determine which STA in the advertising group transmitted the beacon. If the downchain STA transmits an ACK to the user STA 110, the user STA 110 may enter a sleep mode.

In operation 520, the user STA 110 may remove the downchain STA from the list upon failing to receive an ACK from the downchain STA. The user STA 110 may first attempt one or more retransmissions of the beacon to the downchain STA if an ACK is not received from the downchain STA. The retransmission may be in accordance with a standard of the IEEE 802.11 family of standards. The user STA 110 may perform a number of retransmissions over a time interval before determining that communication with the downchain STA is lost. Based on a number of failed retransmissions, the user STA 110 may determine that the downchain STA is out of range, or that the channel conditions between the user STA 110 and the downchain STA have deteriorated. The user STA 110 may remove the downchain STA from the advertising group so that group list information remains updated with STAs that are capable of receiving and transmitting group broadcast information.

The user STA 110 may suppress further transmissions of beacons to the downchain STA upon removing the downchain STA from the list. The user STA 110 may not include social or commercial information for the removed downchain STA in further transmissions, and further transmissions by other STAs in the advertising group 140 may not include information for the removed downchain STA.

The user STA 110 may commence transmitting beacons to a second downchain STA upon removing the downchain STA from the list. An identity of the second downchain STA may be determined based on an inspection of the list. The user STA 110 may wait some time Δt before transmitting the beacon to the second downchain STA to prevent collisions in cases that the first downchain STA attempts to transmit a beacon to the second downchain STA.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method, performed by a first user station (STA), for broadcasting in a wireless network, the method comprising:
   receiving, by the first STA in a beacon, information of an advertising group of STAs, the information including a list of STAs of the advertising group;
   transmitting, by the first STA, a first request to join the advertising group to a first upchain STA, the first upchain STA being included in the list of STAs and an identity of the first upchain STA being determined based on an inspection of the list of STAs;
   transmitting, by the first STA, the beacon subsequent to receiving, from the first upchain STA, a response to the first request; and
   broadcasting, by the first STA, group information for the advertising group periodically, a time interval between broadcasts of group information by each of the first STA and the first upchain STA being based on a number of STAs in the advertising group such that the time interval between broadcasts by the first STA and the first upchain STA increases as the number of STAs in the advertising group increases.

2. The method of claim 1, wherein the information of the advertising group further includes social information or commercial information.

3. The method of claim 1, further comprising:
   transmitting an ACK to the first upchain STA in response to receiving the beacon transmitted by the first upchain STA.

4. The method of claim 3, further comprising:
   receiving a second request to join the advertising group from a downchain STA;
   transmitting the beacon to the downchain STA subsequent to acknowledging the second request, the beacon including the list of STAs of the advertising group, the list including the downchain STA; and
   entering a sleep mode after transmitting the beacon.

5. The method of claim 4, further comprising:
   waking from a sleep mode upon receiving the second request.

6. The method of claim 1, wherein the first request is transmitted during a join window of a broadcasting period.

7. The method of claim 1, further comprising:
   transmitting an ACK to a second upchain STA upon determining that the first upchain STA has not transmitted the beacon within a time interval.

8. The method of claim 1, wherein the group information is received in a broadcast message configured in accordance with a standard of the Institute of Electrical and Electronics Engineers (IEEE) 802.11 family of standards.

9. A wireless communication station (STA) comprising:
   a medium access control (MAC) layer to configure a first request for joining an advertising group of user stations (STAs); and
   physical layer (PHY) circuitry to:
      receive a list of STAs of the advertising group, the STAs of the advertising group being within a broadcast range of the STA,
      transmit the first request to a first upchain STA in a join window of the first upchain STA, the first upchain STA being a member of the list of STAs of the advertising group,
      receive a response to the first request from the first upchain STA, transmit an ACK to the first upchain STA in response to receiving subsequent beacons transmitted by the first upchain STA, and
      periodically broadcast social information or advertising information of the advertising group subsequent to receiving the response to the request a time interval between the broadcasts of group information by a first STA of the list and by each other STA of the list being based on a number of STAs in the advertising group such that the time interval between broadcasts by each STA of the list of STAs increases as the number of STAs in the advertising group increases; and
   one or more processors to
      determine an identity of the first upchain STA based on an inspection of the list of STAs of the advertising group.

10. The STA of claim 9, wherein
the PHY layer is further arranged to:
   receive a second request to join the advertising group from a downchain STA, and
   transmit a beacon to the downchain STA upon accepting the second request; and
the processor is further arranged to
   add the downchain STA to the list of STAs of the advertising group.

11. The STA of claim 9, wherein
the processor is arranged to
   determine that a beacon transmission was received from a second upchain STA, the second upchain STA being different from the first upchain STA, and
   remove the first upchain STA from the list based on the determining, and
the PHY layer is further arranged to transmit an ACK to the second upchain STA based on the determining.

12. The STA of claim 9, wherein the processor is further arranged to:
   wake from a sleep mode upon receiving the request to join the advertising group from the downchain STA; and
   enter the sleep mode after transmitting each periodic broadcast of the group information.

13. A method for reducing device-to-device broadcast failures in a wireless network, the method comprising:
   transmitting, by a first STA, a beacon, the beacon including a list of user stations (STAs) in an advertising group, the list including a downchain STA, the list being ordered to indicate an order in which STAs of the advertising group are to take turns transmitting the beacon, and such that a time interval between transmissions of the beacon by each of the first STA and the downchain STA is based on a number of STAs in the list such that the time interval between broadcast by the first STA and the downchain STA increases as the number of STAs in the advertising group increases;
   removing the downchain STA from the list upon failing to receive, within a first time duration, an acknowledgement (ACK) from the downchain STA.

14. The method of claim 13, further comprising:
entering a sleep mode subsequent to receiving an ACK, from the downchain STA, of the transmission of the beacon.

15. The method of claim 13, further comprising:
retransmitting the beacon to the downchain STA upon failing receiving an ACK from the downchain STA within a second time duration, the second time duration being shorter than the first time duration.

16. The method of claim 13, wherein the removing further comprises: suppressing transmissions of beacons to the downchain STA.

17. The method of claim 13, further comprising:
retransmitting the beacon to a second downchain STA, an identity of the second downchain STA being determined based on an inspection of the list of group STAs in the advertising group.

18. A non-transitory computer-readable medium comprising instructions that, when executed on a machine, cause the machine to:
extract, from a beacon, a list of user stations (STAs) of an advertising group, the STAs of the advertising group being within a broadcast range of the machine;
transmit a first join request to a first upchain STA, an identity of the first upchain STA being determined based on an inspection of the list of STAs,
periodically transmit advertising information or social information of the advertising group subsequent to receiving a response to the first join request, a time interval between transmissions of advertising information or social information by each of STA of the advertising group being based on a number of STAs in the advertising group such that the time interval between broadcasts by each STA of the advertising group increases as the number of STAs in the advertising group increases, and
transmit an ACK to the first upchain STA in response to receiving the beacon transmitted by the first upchain STA; and
store the list of STAs in a memory.

19. The non-transitory computer-readable medium of claim 18, further comprising instructions that, when executed on the machine, cause the machine to:
receive a second request to join the advertising group from a downchain STA;
add the downchain STA to the list of STAs of the advertising group;
transmit the beacon to the downchain STA subsequent to acknowledging the request; and
remove the downchain STA from the list of STAs of the advertising group upon failing to receive an ACK of the beacon from the downchain STA.

20. A wireless communication station (STA) comprising:
physical layer (PHY) circuitry to
broadcast a list of user stations (STAs) in an advertising group, the list including a downchain STA, the STAs of the advertising group being within a broadcast range of the STA, the list being ordered to indicate an order in which STAs of the advertising group are to take turns transmitting group information for the advertising group, wherein a time interval between transmissions of group information by each of the STA and the downchain STA is based on a number of STAs in the advertising group such that the time interval between broadcast by the STA and the downchain STA increases as the number of STAs in the advertising group increases; and
one or more processors to
determine whether an acknowledgment of a broadcast has been received from the downchain STA within a time interval; and
remove the downchain STA from the list or retransmit the broadcast to the downchain STA based on the determining.

21. The STA of claim 20, wherein the PHY layer is further arranged to:
broadcast the group information to a second downchain STA upon the one or more processors removing the first downchain STA from list of STAs in the advertising group.

* * * * *